(No Model.)

T. H. EDWARDS.
VEHICLE AXLE GAGE.

No. 490,804. Patented Jan. 31, 1893.

Witnesses

Inventor
T. H. Edwards.

By his Attorneys,

UNITED STATES PATENT OFFICE.

THOMAS H. EDWARDS, OF LATROBE, CALIFORNIA, ASSIGNOR OF ONE-HALF TO DANIEL KLOS, OF SAME PLACE.

VEHICLE-AXLE GAGE.

SPECIFICATION forming part of Letters Patent No. 490,804, dated January 31, 1893.

Application filed May 3, 1892. Serial No. 431,718. (No model.)

*To all whom it may concern:*

Be it known that I, THOMAS H. EDWARDS, a citizen of the United States, residing at Latrobe, in the county of El Dorado and State of California, have invented a new and useful Vehicle-Axle Gage, of which the following is a specification.

This invention relates to wagon axle sets, and consists in the construction and arrangement of the several parts thereof as will be more fully hereinafter described and claimed.

The object of this invention is to provide a device of this character of simple construction and arrangement of parts and operation and one that will actually verify the set and gather of an axle spindle.

Figure 1:
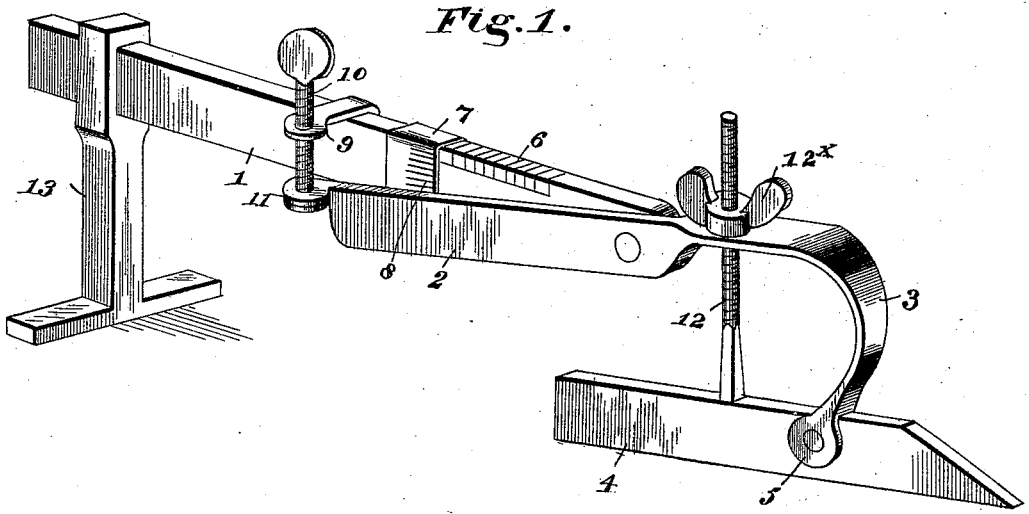
Figure 2:
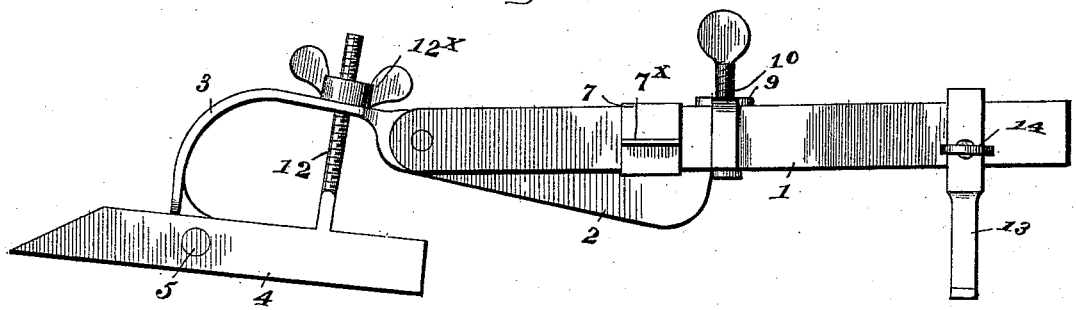
Figure 3:
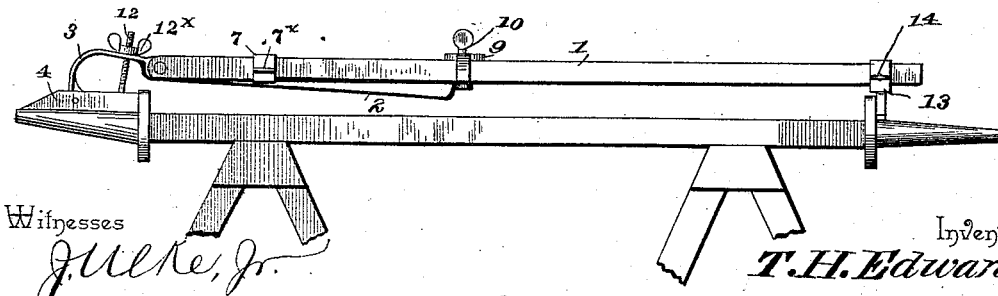

In the drawings—Figure 1 is a perspective view of the improved axle set. Fig. 2 is an elevation from the opposite side thereof to that shown by Fig. 1. Fig. 3 is a view showing the application of the axle set.

Similar numerals of reference indicate corresponding parts in the several figures.

Referring to the drawings, the numeral 1 designates a guide or body bar, to the front end of which is pivoted a gage-bar 2, having a front yoked end 3, the lower end of which is movably connected to a gage-shoe 4, by a pivot 5. On the edge of the guide or body-bar 1 is a scale 6, on which is mounted an indicator 7, having a vertical scale 8. This indicator 7 is movable on the guide or body-bar 1, and has a flange 7× projecting therefrom by which the same may be operated. To the upper portion of the guide or body-bar 1 is secured a screw-threaded ear 9, in which is adjustably seated an adjusting-screw 10, the lower end of the latter being swiveled in an ear 11 on the inner end of the gage-bar 2. Extending upward from the inner portion of the gage-shoe 4 is a rigid screw-rod 12, which passes through the yoked end 3 of the gage-bar and is provided with a thumb-nut 12× for the purpose of adjustment. On the opposite end of the guide or body-bar 1 an arm-rest 13 is adjustably mounted and engaged by a set-screw 14.

To use the device the arm 2 is first set in its zero position, which is the same for all positions of slide-piece 7, or indicator. The rest 13 is then adjusted so that the distance between the parts 13 and 4 is equal to the distance between the outside faces of the spindle collars, and the gage is rested upon the axle, the shoe 4 being adjusted so that its edge will be in contact throughout its whole with the spindle to be bent. This operation sets the gage for taper of spindle. The indicator 7 is then moved on the side or body bar 1, one half of the known height of the wheel to be applied to the spindle, and as will be indicated on the scale 6. The adjusting-screw 10 is then operated to move the bar 2 downwardly over the scale 8 of the indicator 7 a distance equal to the known dish of the wheel. The gage is now ready for use to test the set of the axle as it comes from the axle-setting machine.

It will be understood that the gage or dish of a wheel will be known before the device herein set forth is brought into use, and that the scale 6 and the scale marks 8 on the indicator 7 relatively coact to make the device practicable to be at once arranged to accurately show the proper set or gather of a spindle proportionately to the dish and diameter of the wheel to be applied to the axle, in order to bring the said spindle plumb upon the spokes. The scale 6 designates the dish scale as known to manufacturers, and the scale marks 8 the corresponding diameter, and when the gage-bar 2 is adjusted to bring the upper edge thereof in line with the required scale mark on the indicator 7, the gage-shoe 4 is given the proper angle at which the spindle should be set or gathered. The screw-rod 12 is employed to normally keep the gage-shoe in parallel line with the guide or body bar 1 and thereby render the adjustment of the gage-bar perfectly accurate with relation to the scales 6 and 8.

Having thus described the invention, what is claimed as new is—

In an axle set, the combination of the guide-bar 1, the gage-bar 2 pivoted to the front end thereof having a front yoked end 3, the gage shoe 4 pivoted to the lower end of the said yoke and of a length to agree with the length of the axle spindle, the screw-rod 12 rising from the rear portion of the upper edge of the gage-shoe and passing through the aforesaid yoked end of the gage-bar and provided with an adjusting thumb-nut, the adjusting devices for the inner end of the gage-bar, the indicator 7, and the rest 13, substantially as described.

In testimony that I claim the foregoing as my own I have hereto affixed my signature in the presence of two witnesses.

THOMAS H. EDWARDS.

Witnesses:
  LOUIS J. MÜLLER,
  HERMAN E. MÜLLER.